(12) United States Patent
Lee et al.

(10) Patent No.: US 9,264,342 B2
(45) Date of Patent: Feb. 16, 2016

(54) TERMINAL DEVICE BASED ON CONTENT NAME, AND METHOD FOR ROUTING BASED ON CONTENT NAME

(75) Inventors: Ji Hoon Lee, Anyang-si (KR); Myeong Wuk Jang, Seoul (KR); Jae Hoon Kim, Yongin-si (KR); Joong Hong Park, Seoul (KR); Sung Chan Choi, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 12/946,037

(22) Filed: Nov. 15, 2010

(65) Prior Publication Data

US 2011/0161355 A1   Jun. 30, 2011

(30) Foreign Application Priority Data

Dec. 24, 2009  (KR) .................. 10-2009-0131093
Aug. 24, 2010  (KR) .................. 10-2010-0082030

(51) Int. Cl.
| | | |
|---|---|---|
| *G06F 17/30* | (2006.01) |
| *H04L 12/56* | (2006.01) |
| *H04L 12/701* | (2013.01) |
| *H04L 12/725* | (2013.01) |
| *H04L 12/931* | (2013.01) |
| *H04L 29/08* | (2006.01) |
| *H04L 12/741* | (2013.01) |

(52) U.S. Cl.
CPC .......... *H04L 45/00* (2013.01); *G06F 17/30861* (2013.01); *G06F 17/30982* (2013.01); *H04L 45/306* (2013.01); *H04L 49/355* (2013.01); *H04L 67/06* (2013.01); *H04L 67/327* (2013.01); *H04L 45/54* (2013.01)

(58) Field of Classification Search
CPC .......... G06F 11/3433; G06F 17/30982; G06F 17/30861; H04L 45/00
See application file for complete search history.

(56) References Cited

U.S. PATENT DOCUMENTS

| | | | |
|---|---|---|---|
| 6,363,434 B1 | 3/2002 | Eytchison | |
| 6,850,980 B1 | 2/2005 | Gourlay | |
| 7,505,429 B2 * | 3/2009 | Seol | ............... 370/329 |
| 7,627,570 B2 * | 12/2009 | Bosloy et al. | |
| 2002/0095400 A1 * | 7/2002 | Johnson et al. | ............. 707/1 |
| 2003/0099237 A1 | 5/2003 | Mitra et al. | |
| 2003/0145038 A1 * | 7/2003 | Bin Tariq et al. | ............. 709/202 |
| 2006/0177094 A1 | 8/2006 | Smith | |
| 2006/0184632 A1 * | 8/2006 | Marino et al. | ............. 709/206 |

(Continued)

FOREIGN PATENT DOCUMENTS

| | | |
|---|---|---|
| JP | 2001-358699 | 12/2001 |
| JP | 2006-094551 | 4/2006 |

(Continued)

OTHER PUBLICATIONS

Obermeier, Sebastian; XML Fragment Caching for Large-Scale Mobil Commerce Applcations;2009;ICEC.*

(Continued)

*Primary Examiner* — William Spieler
(74) *Attorney, Agent, or Firm* — NSIP Law

(57) ABSTRACT

In a network system based on a content name, a terminal device may generate and transmit a block query requesting a plurality of segments, and may receive segments corresponding to the block query based on a transmission direction of the block query.

19 Claims, 7 Drawing Sheets

(56) References Cited

U.S. PATENT DOCUMENTS

| | | | |
|---|---|---|---|
| 2008/0123662 A1* | 5/2008 | Basso et al. | 370/395.31 |
| 2008/0133464 A1* | 6/2008 | Shin | 707/2 |
| 2009/0083279 A1* | 3/2009 | Hasek | 707/10 |
| 2010/0040072 A1* | 2/2010 | Kitada | 370/400 |

FOREIGN PATENT DOCUMENTS

| | | |
|---|---|---|
| KR | 10-2004-0053145 | 6/2004 |
| KR | 10-2005-0012776 | 2/2005 |
| KR | 10-2005-0059065 | 6/2005 |
| KR | 10-2005-0065387 | 6/2005 |
| KR | 10-2008-0035416 | 4/2008 |
| KR | 10-2008-0082004 | 9/2008 |
| KR | 10-2009-0041440 | 4/2009 |

OTHER PUBLICATIONS

Extended European Search Report (including European Search Opinion) issued May 4, 2011, in counterpart European Patent Application No. 10192619 (8 pages).

Cheriton, Mgritter, "Triad: A New Next-Generation Internet Architecture", 2000, pp. 1-20, Stanford University, Computer Science Department.

Hwang, Haesung, et al., "A Feasibility Evalutation on Name-Based Routing," IP Operations and Management, Lecture Notes in Computer Science, 2009, pp. 120-142, vol. 5843 (Publisher: Springer Berlin / Heidelberg).

Obermeier, Sebastian, et al., "XML Fragment Caching for Large-Scale Mobile Commerce Applications", Proceedings of the $10^{th}$ International Conference on Electronic Commerce, Innsbruck, Austria, Aug. 19-22, 2008 (7 pages), vol. 342 (Publisher: ACM).

* cited by examiner

TERMINAL DEVICE BASED ON CONTENT NAME, AND METHOD FOR ROUTING BASED ON CONTENT NAME

CROSS-REFERENCE TO RELATED APPLICATION(S)

This application claims the benefit under 35 U.S.C. §119 (a) of Korean Patent Application No. 10-2009-0131093, filed on Dec. 24, 2009, and Korean Patent Application No. 10-2010-0082030, filed on Aug. 24, 2010, in the Korean Intellectual Property Office, the entire disclosures of which are each incorporated herein by reference for all purposes.

BACKGROUND

1. Field

The following description relates to technology for routing data in a content-based network, and more particularly, to a terminal device, system, and routing method that may route requested data between network apparatuses based on content name.

2. Description of Related Art

The Internet may be used to provide a one-to-one communication based on a host-to-host connection. However, in an actual Internet environment, networking may be performed based on data or contents, instead of the network hosts. For example, users may have more interest in data rather than an apparatus that stores the data.

During the reception of desired data using a network apparatus, a redundant procedure may occur because of non-matching between an Internet structure and an actual utilization pattern. This redundant procedure may deteriorate the throughput of a network.

Accordingly, there is a desire for routing technology that may match an Internet structure with an actual utilization pattern and also enhance the throughput of a network.

SUMMARY

In one general aspect, there is provided a terminal device based on content name, the terminal device comprising a query generator to generate, with respect to content comprising a plurality of segments, a block query comprising a content name and a block range of segments of the content, a table search unit to search a routing table for the content name corresponding to the generated block query, a field setting unit to set a flag corresponding to the found content name, and to set a block range of segment numbers corresponding to the generated block query in a number field, and a query transmitter to transmit the block query using a transmission direction corresponding to the found content name, wherein the block range of segments corresponding to the block query have the same transmission direction.

The field setting unit may be configured to set a state field of each of the block range of segments corresponding to the block query.

When at least one of the block range of segments corresponding to the block query is received within a predetermined lifetime, the query generator may be configured to adjust the block range, and to generate the block query comprising the adjusted block range and the content name.

The terminal may further comprise a content receiver to receive the block range of segments corresponding to the block query using the same direction as the transmission direction of the block query.

The content receiver may be configured to receive the block range of segments corresponding to the block query and one or more of the block range of segments have different routing paths.

In another aspect, there is provided a method for routing based on content name, the method comprising generating, with respect to content comprising a plurality of segments, a block query comprising a content name and a block range of segments of the content, searching a routing table for the content name corresponding to the generated block query, setting a flag corresponding to the found content name, and setting a block range of segment numbers corresponding to the generated block query in a number field, and transmitting the block query using a transmission direction corresponding to the found content name, wherein the block range of segments corresponding to the block query have the same transmission direction.

The method may further comprise setting a state field of each of the block range of segments corresponding to the block query.

The generating may comprise adjusting the block range when at least one of the block range of segments corresponding to the block query is received within a predetermined lifetime, and generating the block query comprising the adjusted block range and the content name.

The method may further comprise receiving the block range of segments corresponding to the block query using the same direction as the transmission direction of the block query.

One or more of the received block range of segments corresponding to the block query may have different routing paths.

In another aspect, there is provided a terminal device based on content name, the terminal device comprising a query receiver to receive a block query that requests content, wherein the content comprises a plurality of segments and the block query requests at least two segments from among the plurality of segments, a table search unit to search a routing table for a content name corresponding to the requested content, and a field setting unit to set a flag corresponding to the found content name, wherein the at least two segments corresponding to the block query have the same transmission direction.

The terminal device may further comprise a query transmitter to transmit the block query using a transmission direction corresponding to the found content name, based on whether the requested content is stored.

The field setting unit may be configured to set a state field of the requested content in the routing table, and to set a reception direction of the block query with respect to the at least two segments corresponding to the block query.

The terminal device may further comprise a content transmitter to transmit each of the at least two segments corresponding to the block query using the set reception direction.

The terminal device may further comprise a content receiver to receive at least one segment from among the at least two segments corresponding to the block query using a transmission direction of the block query when the requested content is not stored.

In another aspect, there is provided a method for routing based on content name, the method comprising receiving a block query requesting content, wherein the content comprises a plurality of segments and the block query requests at least two segments from among the plurality of segments, searching a routing table for a content name corresponding to the requested content, and setting a flag corresponding to the found content name, wherein the at least two segments corresponding to the block query have the same transmission direction.

The method may further comprise transmitting the block query using a transmission direction corresponding to the found content name, based on whether the requested content is stored.

The method may further comprise setting a state field of the requested content in the routing table, and setting a reception direction of the block query with respect to the at least two segments corresponding to the block query.

The method may further comprise transmitting each of the at least two segments corresponding to the block query using the set reception direction.

The method may further comprise receiving at least one segment from among the at least two segments corresponding to the block query using a transmission direction of the block query when the requested content is not stored.

In another aspect, there is provided a network apparatus using a routing table, the network apparatus comprising a content name field used to search for content comprising a plurality of segments, a transmission direction field used to transmit a query for requesting the content, a reception direction field to indicate a reception direction of the query, a flag field to indicate whether the query corresponds to a block query requesting at least two segments from among the plurality of segments, and a number field to indicate a number of a segment corresponding to the requested query.

The network apparatus may further comprise a state field to indicate whether the content corresponding to the transmitted query is received, and a time field to indicate a reception lifetime of the content.

The query may be transmitted using a transmission direction set in the transmission direction field, and the content corresponding to the query may be received using a transmission direction of the query, and the reception direction field may comprise the reception direction of the query, and the content corresponding to the query may be transmitted using the reception direction of the query.

The block query may comprise a content name and a block range, and the block range may comprise a start segment and a last segment from among the at least two segments corresponding to the block query.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, description of well-known functions and constructions may be omitted for increased clarity and conciseness.

Figure 1:
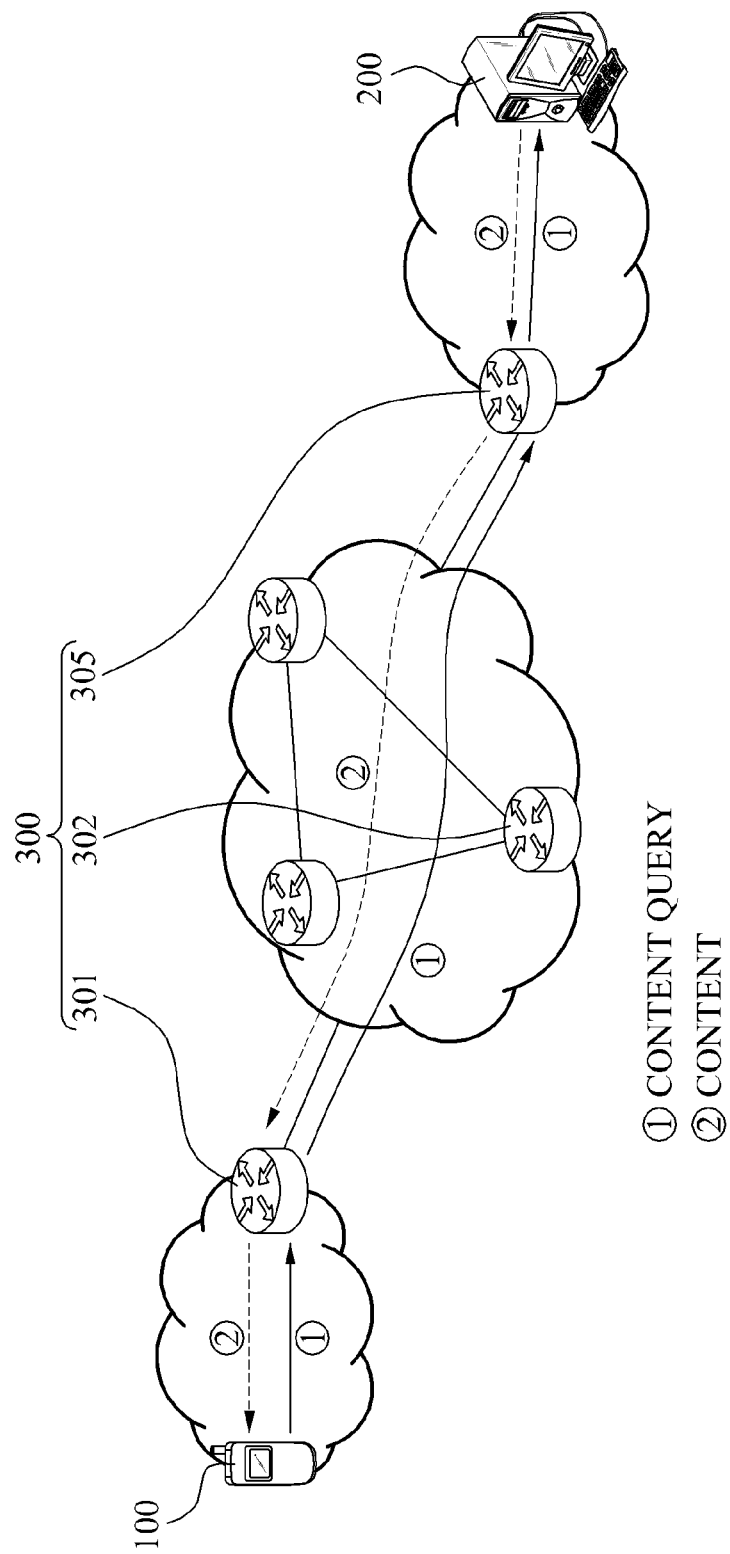
FIG. 1 is a diagram illustrating an example of a network based on content name.

FIG. 1 illustrates an example of a network based on content name.

Referring to FIG. 1, the network includes a transmitting terminal device 100 requesting content, a receiving terminal device 200 sharing content with the transmitting terminal device 100, and at least one network apparatus 300. In this example, each network apparatus 300 may route the content between the transmitting terminal device 100 and the receiving terminal device 200. While this example includes one transmitting terminal device 100 and one receiving terminal device 200, the present description is not limited thereto, and it should be appreciated that more terminal devices may be included in the network. It should also be appreciated that the transmitting terminal device may also be a receiving device, and vice versa.

As an example, the transmitting and/or receiving terminal device may be a mobile phone, a desk top, a personal computer (PC), a notebook computer, a personal digital assistant (PDA), a digital multimedia broadcasting (DMB) phone, a proxy node, and the like. As an example, the network device 300 may be a switch, a router, and the like. As another example, the network device 300 may be a transmitting and/or receiving terminal such as transmitting terminal device 100 or receiving terminal device 200.

The transmitting terminal device 100 may transmit a content query for requesting content. For example, the content query may be transmitted to the receiving terminal device 200 via the at least one network apparatus 300.

The receiving terminal device 200 may analyze the content query and transmit, to the transmitting terminal device 100, the content requested by the transmitting terminal device 100. For example, the content may be transferred to the transmitting terminal device 100 in a reverse order with respect to a routed path of the content query.

For example, when the content query is transferred in an order of a first router 301, a second router 302, and a fifth router 305, and is received by the receiving terminal device 200, the content transmitted from the receiving terminal device 200 may be transmitted to the transmitting terminal device 100 using routers in the reverse order of the fifth router 305, the second router 302, and the first router 301.

In this example, each router transferring content may transfer the content to a corresponding router or the transmitting terminal device 100 via a port, based on a routing table. A process of transferring the content using the routing table is further described herein.

Figure 2:
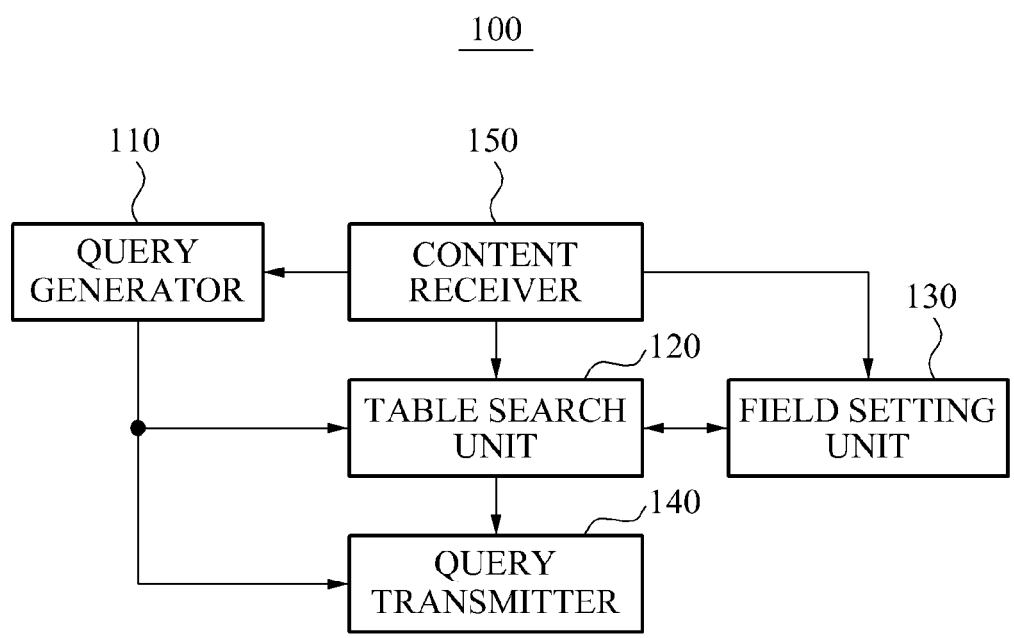
FIG. 2 is a diagram illustrating an example of a transmitting terminal device.

FIG. 2 illustrates an example of a transmitting terminal device.

Referring to FIG. 2, transmitting terminal device 100 includes a query generator 110, a table search unit 120, a field setting unit 130, a query transmitter 140, and a content receiver 150.

The query generator 110 may generate a query for requesting a plurality of segments that make up content. For example the query may request at least two segments from among the plurality of segments. The query generator 110 may generate a block query. The block query may include a block range of the content and a content name.

For example, to generate a request for content of "xyz.avi", the block query generated by the query generator 110 may be expressed as shown in Table 1.

TABLE 1

/abc.com/branch1/Comm_Lab/NWG/ xyz(Sn:Sm).avi

In the example of Table 1, the block range may include a start segment number Sn and a last segment number Sm.

Figure 3:
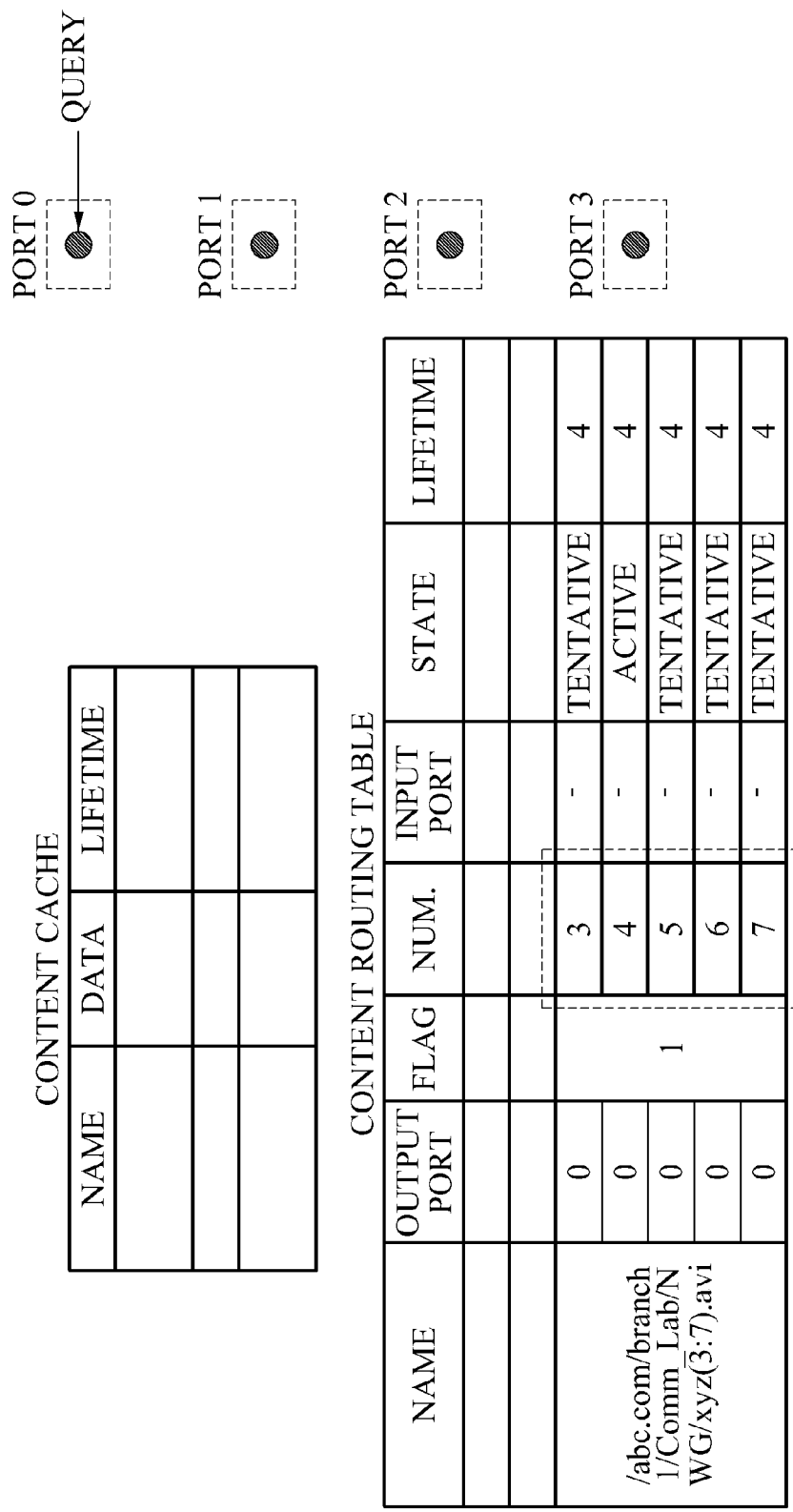
FIG. 3 is a diagram illustrating an example of a routing table based on content name.

For example, referring to FIG. 3, when the size of the block range is set to "5" and segments starting from segment 3 are requested, the query generator 110 may generate a block query requesting segments from the segment 3 to a segment 7, that is, the segments 3, 4, 5, 6, and 7. The segments 3, 4, 5, 6, and 7 that correspond to the block query may have the same transmission direction. The example in FIG. 3 illustrates an example of a routing table based on content name.

For example, a port may be used for the transmission direction. In this example, output ports of the segments 3, 4, 5, 6, and 7 corresponding to the block query may be the same, for example, the output port for each segment may be port "0" as shown in FIG. 3. In some embodiments, one or more segments may be output via one or more different ports and may be received via one or more different ports.

The query generator 110 may adjust the size of the block range based on whether the requested content is received. For example, the query generator 110 may adjust the size of the block range to increase by one. When the size of the block range is adjusted, the block range of segments requested may also be adjusted.

For example, when the block query requesting the segments 3, 4, 5, 6, and 7 is transmitted, and one of the segments 3, 4, 5, 6, and 7 is received within a corresponding lifetime, the query generator 110 may increase the size of the block range, for example, increase the block range from "5" to "6". Each time a segment is received within a corresponding lifetime, the query generator 110 may increase the size of the block range by one.

When a segment request is not received within a corresponding lifetime, and when the number of retransmissions meets or exceeds a reference value, the query generator 110 may readjust the size of the block range to default. For example, the query generator 110 may decrease the increased block range from "6" back to the default value of "5".

The table search unit 120 may search a routing table for the content name corresponding to the block query. For example, referring to the routing table of FIG. 3, the table search unit 120 may search a content name field NAME for "abc.com/branch1/Comm_Lab/NWG/xyz.avi". That is, the content matching scheme does not need to match or identify an identical match to the requested content name. Instead, for example, the content matching scheme may identify a content name that most clearly matches the requested content name.

For example, the table search unit 120 may search the routing table for the name of a corresponding content using a longest matching scheme. For example, the table search unit 120 may search the content name field NAME for a content name that is most frequently matched with the content name corresponding to the block query.

As another example, the table search unit 120 may determine a transmission direction corresponding to the found content name.

As shown in FIG. 3, the table search unit 120 may determine, port "0" as the output port for segments 3, 4, 5, 6, and 7 corresponding to the content name found from the routing table. The segments 3, 4, 5, 6, and 7 corresponding to the found content name may correspond to segments included in a block range of the block query generated by the query generator 110.

The field setting unit 130 may set a flag field, a number field, and a state field in response to the found content name.

For example, the field setting unit 130 may set the flag field to indicate whether segments corresponding to the found content name are included in the block query. When the segments are included in the block query, the field setting unit 130 may set the flag field to "1" as shown in FIG. 3.

The field setting unit 130 may set the number field to correspond to the found content name, based on the block range of the block query. For example, as shown in FIG. 3, the field setting unit 130 may set corresponding number fields to correspond to the segments 3, 4, 5, 6, and 7.

When the block query is transmitted from the query transmitter 140, the field setting unit 130 may set the state field corresponding to the found content name. For example, the field setting unit 140 may set the states of segments 3, 4, 5, 6, and 7 to "tentative."

As another example, when segments corresponding to the block query are received by the content receiver 150, the field setting unit 130 may set states of the received segments to "active". For example, the state "tentative" may indicate a state where a segment corresponding to the transmitted query is not received, and the state "active" may indicate a state where the segment corresponding to the transmitted query is received.

The query transmitter 140 may transmit the generated query using the determined transmission direction by searching the routing table. In the example shown in FIG. 3, the transmission direction is output port "0".

For example, when the block query is generated and the transmission direction is determined as the output port "0", the query transmitter 140 may transmit the block query using port "0". When a segment is not received within a corresponding lifetime, the query transmitter 140 may retransmit the query requesting the segment that was not received. For example, when the lifetime is elapsed, the query transmitter 140 may retransmit a query requesting segments of which states are still set to "tentative".

The query transmitter 140 may count or keep track of the number of retransmissions. For example, when a segment corresponding to the retransmitted query is not received within a corresponding lifetime, the query transmitter 140 may transmit the query requesting the segment that was not received a number of times until the counted number of retransmissions reaches a predetermined reference value.

When the segment corresponding to the retransmitted query is not received when the counted number of retransmissions reaches or exceeds the predetermined reference value, the table search unit 120 may delete a field corresponding to the not-received segment from the routing table.

For example, when the reference value is set to "3" and the lifetime is set to "4 seconds", and segments 3, 4, 6, and 7 are received and the segment 5 is not received during the lifetime of "4 seconds", the table search unit 120 may delete a transmission direction field, a number field, a state field, and a lifetime field corresponding to the segment 5, from the routing table.

In this example, the query generator 110 may adjust the size of the block range to the default value of "5", and may generate a block query including an indication that the segment 5 was not received.

For example, the query generator 110 may generate a block query requesting segments 5, 8, 9, 10, and 11. In another example, the query generator 110 may generate a query requesting only segment 5. In this example, the query transmitter 140 may transmit the generated block query or the query using the transmission direction corresponding to the block query or the query.

For example, the content receiver 150 may receive content using the same direction as the transmission direction of the block query. The table search unit 120 may set a state field of the received content by searching the routing table. In some embodiments, a plurality of segments corresponding to the block query may have different routing paths.

For example, when the block query including the segments 3, 4, 5, 6, and 7 is transmitted using port "0," the content receiver 150 may receive each of the segments 3, 4, 5, 6, and 7 using the port "0." Each of the segments 3, 4, 5, 6, and 7 may pass through a different router and may be received using the port "0" of the transmitting terminal device 100. In this example, the table search unit 120 may change the state field of each of the segments 3, 4, 5, 6, and 7 from "tentative" to "active" to thereby set the state field to "active".

When content is received via a plurality of network apparatuses, the content may be received by the transmitting terminal device 100 using ports used for transmitting a block query in a reverse order.

Figure 4:
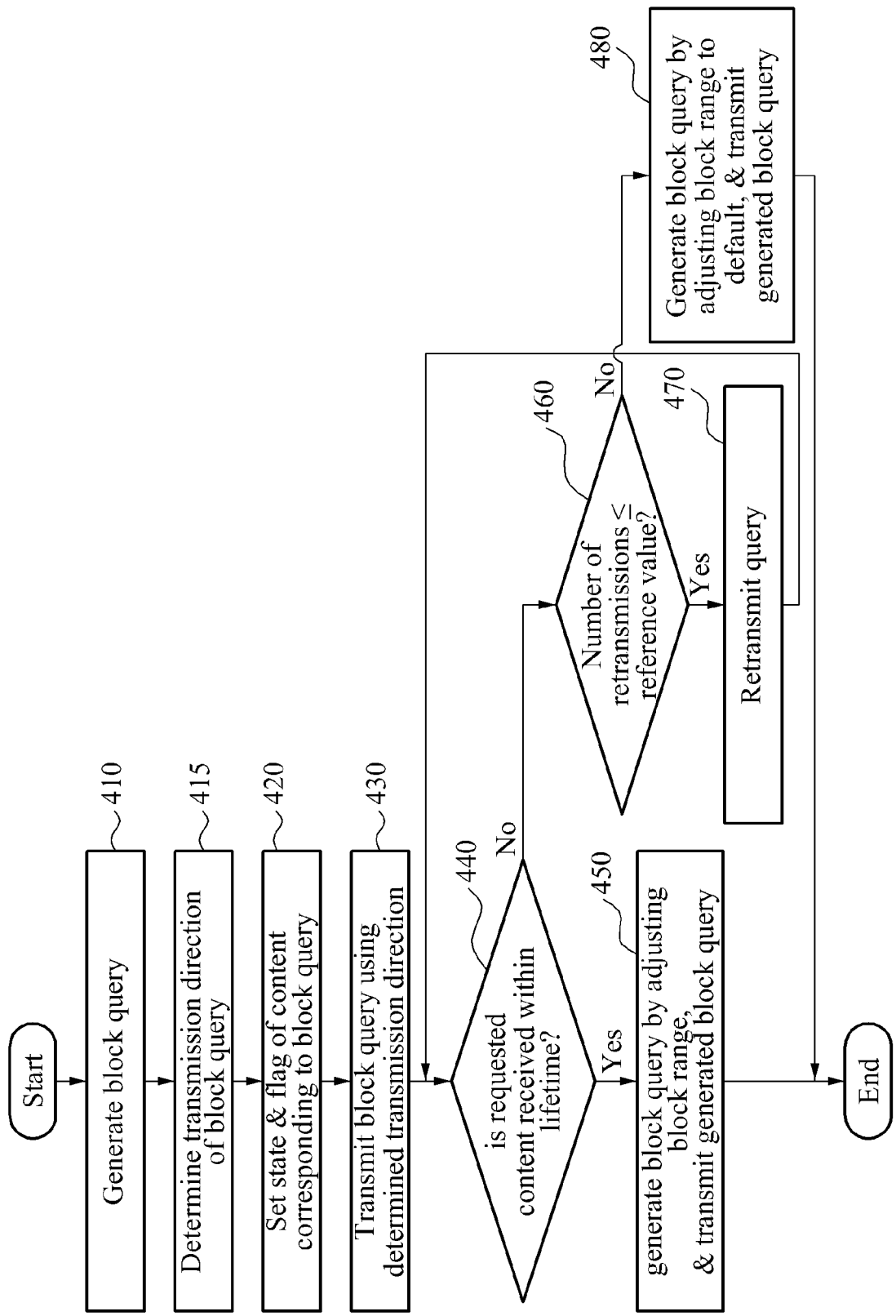
FIG. 4 is a flowchart illustrating an example of a method of a transmitting terminal device.

FIG. 4 illustrates an example of a method of a transmitting terminal device.

Referring to FIG. 4, in 410, a query generator generates a block query with respect to content including a plurality of segments. For example, the block query may include a block range and a content name. For example, when segments 3, 4, 5, 6, and 7 are requested, the block range of the block query may include a start segment number 3 and a last segment number 7. The query generator may generate a query requesting one or more segments using the block query.

In 415, a table search unit determines a transmission direction of the generated block query. For example, as shown in FIG. 3, the table search unit may search the routing table for the content name, and may determine an output port corresponding to the found content name. The found content name corresponds to segments requested using the block query.

In 420, a field setting unit sets a state field and a flag field of the content corresponding to the block query. For example, the field setting unit may set a state field of each of the segments corresponding to the block query to "tentative", and set the flag field thereof to "1".

In 430, a query transmitter transmits the generated block query using the determined transmission direction. For example, when the output ports of the segments 3, 4, 5, 6, and 7 are output port "0" based on a search result of the routing table, the query transmitter may transmit the block query using port "0." A content receiver may receive the segments 3, 4, 5, 6, and 7 corresponding to the block query using the port "0" via which the block query is transmitted. In this example, a plurality of segments, for example, the segments 3, 4, 5, 6, and 7 corresponding to the block query may have different routing paths.

When the requested content is received within a lifetime in 440, the query generator adjusts the size of the block range in 450 and transmits the adjusted block query. For example, when the segments 3, 4, 5, 6, and 7 corresponding to the block query are received within the lifetime, the query generator may adjust the size of the block range. For example, when the size of the block range is set to a default of "5", and when one of the requested segments is received, the query generator may adjust the size of the block range to increase the size from "5" to "6". When the size of the block range is adjusted, the block range of segments requested may also be adjusted.

Conversely, when the requested content is not received within the lifetime in 440, the terminal device may determine whether a retransmission request for the segment or segments that were not received has been transmitted. In 470, if the number of retransmission does not meet or exceed a reference value, the terminal device retransmits the query. For example, the query transmitter may count a number of retransmissions with respect to the retransmitted query. When the requested content is not received within the lifetime, the query transmitter may retransmit the query until the counted number of retransmissions meets or exceeds a predetermined threshold. For example, in 470 the query transmitter may retransmit a query requesting segments that have states which are set to "tentative".

When the number of retransmissions meets or exceeds the predetermined reference value in 460, in 480 the query generator may adjust or reduce the size of the block range. For example, the query generator 110 may generate a block query corresponding to the default number of segments based on the adjusted size of the block range.

The query transmitter may transmit the block query using the transmission direction corresponding to the generated block query. For example, the block query may include the adjusted block range and a content name including the segments corresponding to the adjusted block range.

Figure 5:
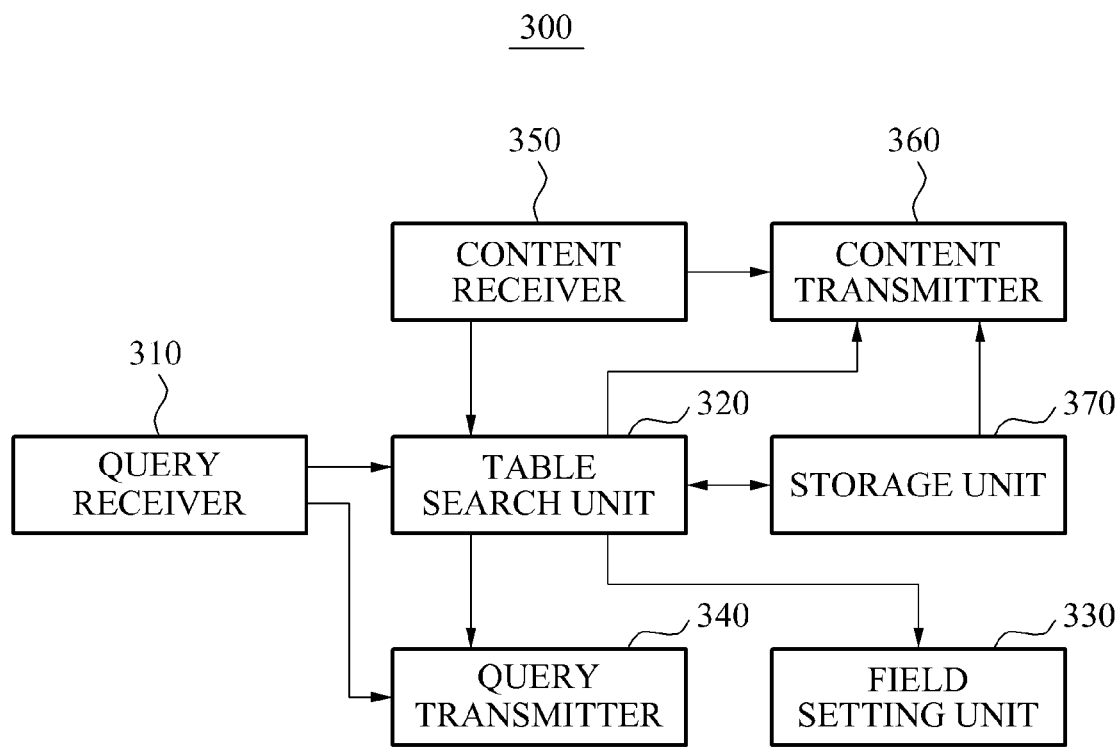
FIG. 5 is a diagram illustrating an example of a network apparatus based on content name.

FIG. 5 illustrates an example of a network apparatus based on content name.

Referring to FIG. 5, network apparatus 300 includes a query receiver 310, a table search unit 320, a field setting unit 330, a query transmitter 340, a content receiver 350, a content transmitter 360, and a storage unit 370. For example, the network apparatus 300 may correspond to the receiving terminal device 200 of FIG. 1. In the example of the receiving terminal device 200, the query transmitter 340 and the content receiver 350 of FIG. 5 may not be included in the network apparatus 300.

The table search unit 320, the field setting unit 330, and the query transmitter 340, and the content receiver 350 may substantially function as the same as described above with reference to FIG. 2 and thus, further description is omitted here.

The query receiver 310 may receive a query or a block query from a transmitting terminal device. For example, the block query may include a content name and a block range. The block range may include a start segment number and a last segment number. The block query may be used to request one or more segments included in the content.

For example, when a block query requests segments 3, 4, 5, 6, and 7 with respect to a content that includes 20 segments, the block range may include a start segment number 3 and a last segment number 7.

The table search unit 320 may verify whether the content corresponding to the block query is stored in the storage unit 370. In some embodiments, a cache may be used for the storage unit 370.

Figure 6:
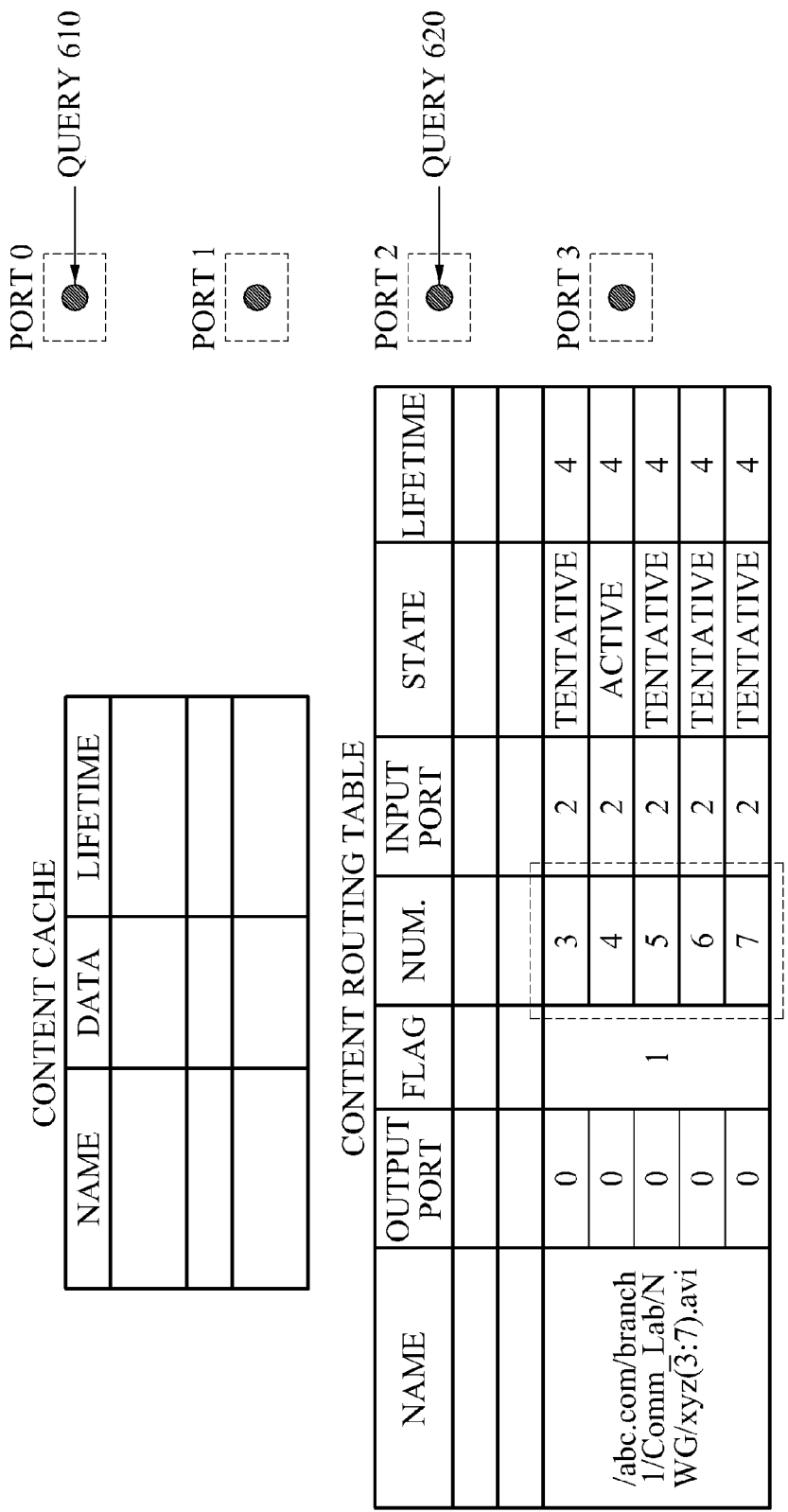
FIG. 6 is a diagram illustrating another example of a routing table based on content name.

When the content is stored, the table search unit 320 may search the routing table of FIG. 6 for the content name. FIG. 6 illustrates another example of a routing table based on content name.

The field setting unit 330 may set a state field, a flag field, and a reception direction field corresponding to the found content name. The reception direction field may indicate a direction via which the block query is received. For example, when the block query is received, the field setting unit 330 may set the flag field of each of segments corresponding to the block query, to "1." When setting the state field, the field setting unit 330 may set the state of each of the segments corresponding to the block query to "tentative" while the table search unit 320 verifies whether the content is stored in the storage unit 370.

When the content corresponding to the block query is transmitted via the content transmitter 360, the field setting unit 330 may change the state of each of the segments corresponding to the block query from "tentative" to "active", and thereby set the state field of each segment.

The content transmitter 360 may transmit the content corresponding to the block query using a corresponding reception direction, by referring to the reception direction field. For example, the direction through which the block query is received from the network apparatus 300 such as a router and the like, or from a transmitting terminal device, may be the same as to the transmission direction of the content.

For example, when the block query is received via port 2 620, the field setting unit 330 may set the reception direction field to "2", for example, an input port field of each of the segments 3, 4, 5, 6, and 7 corresponding to the block query. In this example, the table search unit 320 may determine the port 2 620 as the transmission direction of the content, and the content transmitter 360 may transmit the segments 3, 4, 5, 6, and 7 via the port 2 620.

When the content is not stored, the table search unit 320 may search the routing table for the content name, and may determine a transmission direction corresponding to the found content name. For example, the table search unit 320 may search the routing table for the content name using a longest matching scheme.

For example, as shown in FIG. 6, the table search unit 320 may search the routing table, and may determine the transmission direction of each of the segments 3, 4, 5, 6, and 7 as "0". The query transmitter 340 may transmit the block query corresponding to the segments 3, 4, 5, 6, and 7 via a determined port 0 610.

When segments corresponding to the transmitted block query are not received within a corresponding lifetime, the table search unit 320 may delete, from the routing table, the fields corresponding to the segments that are not received. The segments corresponding to the block query may be received via the content receiver 350. As described above, in some embodiments a transmitting terminal device may retransmit a query requesting the segments that were not received. As another example, the network apparatus 300 may delete the fields corresponding to the not-received segments from the routing table, without retransmission, thus decreasing a transmission burden of a network.

When the content is not stored, the field setting unit 330 may set a state field, a flag field, a number field, and a reception direction field of each of the segments 3, 4, 5, 6, and 7 corresponding to the block query.

For example, the field setting unit 330 may set the state field to "tentative", set the flag number to "1", set a corresponding segment number in each number field, and set the reception direction field, for example, the input port field to be port 2.

Figure 7:
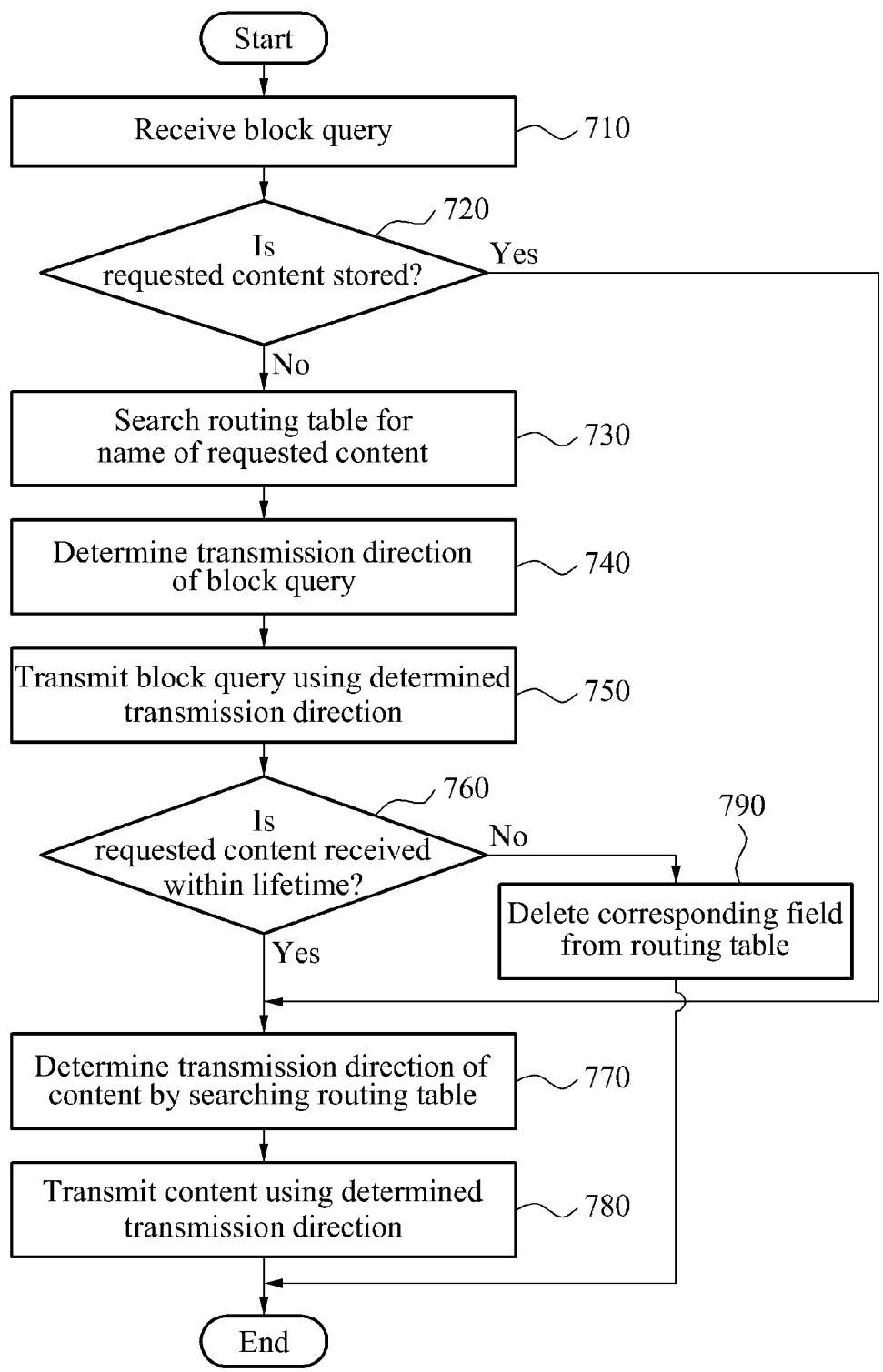
FIG. 7 is a flowchart illustrating an example of a method of a network apparatus that transmits/receives data based on content name.

FIG. 7 illustrates an example of a network apparatus that transmits/receives data based on content name.

Referring to FIG. 7, in 710, a query receiver receives a block query from a transmitting terminal device. The block query may include a content name and a block range. For example, the block query may be used to request one or more segments from among a plurality of segments included in the content.

A field setting unit may set a reception direction of the block query in a reception direction field of a routing table. For example, as shown in FIG. 6, when the block query is received via port 2, the field setting unit may set the reception direction field as "2".

In 720, a table search unit may verify whether the requested content is stored in a storage unit. For example, the table search unit may verify whether segments corresponding to the block query are stored in the storage unit. While the content is being searched in the storage unit, the field setting unit may set the state field of each of the segments corresponding to the block query to the state of "tentative".

When the content is not stored, the table search unit may search the routing table for the content name included in the block query, in 730. For example, the table search unit may search the routing table for the content name using a longest matching scheme.

In 740, the table search unit may determine a transmission direction of the block query in the routing table, based on the found content name. For example, as shown in FIG. 6, the table search unit may determine, as the transmission direction of the block query, port "0" corresponding to the found content name.

In 750, the query transmitter 340 may transmit the block query using the determined transmission direction.

When the requested content is received within a lifetime, in 760, the table search unit 320 may determine the transmission direction of the content by searching the routing table, in 770. For example, the transmission direction of the content may be the same as the reception direction of the block query received in 710. For example, the transmission direction of the content may be determined as port "2".

In 780, a content transmitter may transmit the content using the determined transmission direction of the content.

For example, when the block query is received from the transmitting terminal device, the content may be transmitted to the transmitting terminal device via port "2". When the block query is received from another network apparatus, the content may be transmitted, via port "2", to the other network apparatus that transmitted the block query in 710.

When the requested content is stored in 720, the table search unit may determine the transmission direction of the stored content in 770. The content transmitter may transmit the stored content using the determined transmission direction, in 780.

The field setting unit may change a state field corresponding to the transmitted content from "tentative" to "active" and thereby set the state field.

When the requested content is not received within the lifetime in 760, the table search unit may delete, from the routing table, fields corresponding to the content not received, in 790.

For example, when a segment 5 is not received within a corresponding lifetime, the table search unit may delete, from the routing table, fields corresponding to the segment 5.

Even though the block query is described to include the content name and the block range, the block query may further include a domain name as shown in Table 1.

As described above, segments corresponding to the block query may be received using a port via which the block query is transmitted. For example, physically a single port may be used, or the single port may include two logic interfaces. For example, the output or input port "0" may be configured as a single physical port, however, the output or input port "0"

may include a logic interface to transmit the block query and a logic interface to receive a segment corresponding to the block query. Accordingly, even though the single port is employed, it is possible to logically classify a transmission of the block query from a reception of the segment. As another example, even though each of port "1" through port "3" may be configured as a single physical port, each of the port "1" through the port "3" may include two logic interfaces.

IAs another example, one or more ports may be configured as two physical ports for dualization. For example, each of the port "0" through the port "3" may physically include a primary port and a secondary port. A query transmitter may transmit a block query using the primary port, and the content receiver may receive a segment corresponding to the block query using the primary port. When a malfunctionality is found in the primary port, the query transmitter may transmit the block query using the secondary port and the content receiver may receive the segment corresponding to the block query using the secondary port.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal device, comprising:
a query generator configured to generate, with respect to content comprising segments, a block query requesting at least two segments from among the segments, wherein the at least two segments are to be routed based on a content name of the content, the block query comprises the content name and a block range indicating the at least two segments;
a table search processor configured to search, from a routing table, a content name which is longest-matched with the content name, and to determine a transmission direction of the block query, wherein the transmission direction comprises an output port, provided in the routing table, corresponding to the searched content name;
a query transmitter configured to transmit the block query via the output port; and
a content receiver configured to receive the at least two segments via an input port corresponding to the output port,
wherein the query generator is further configured to increase a size of the block range in response that the at least two segments are received within a predetermined reception lifetime, to decrease the size of the block range in response that any of the at least two segments is not received within the predetermined reception lifetime, and to generate a new block query based on the adjusted size of the block range.

2. The terminal device of claim 1, further comprising:
a field setting processor configured to set a flag of a flag field corresponding to the content name, apply the flag to a flag field assigned to the at least two segments in the routing table in order to indicate that the at least two segments are included in the block query, and set, for segments among the at least two segments have the same transmission direction, a block range of segment numbers corresponding to the generated block query in a number field,
wherein the field setting unit is configured to set a state field of each of the block range of segments corresponding to the block query.

3. The terminal device of claim 2, wherein the table search processor is configured to delete at least one of the flag field and the number field of segments among the at least two segments that are not received within a predetermined reception lifetime.

4. The terminal device of claim 1, wherein one or more of the block range of segments have different routing paths.

5. A method for routing based on content name, comprising:
generating, with respect to content comprising segments, using a processor, a block query requesting at least two segments from among the segments, wherein the at least two segments are to be routed based on a content name of the content, the block query comprises the content name and a block range indicating the at least two segments;

searching, using the processor, from a routing table, a content name which is longest-matched with the content name;

determining, using the processor, a transmission direction of the block query, wherein the transmission direction comprises an output port, provided in the routing table, corresponding to the searched content name;

transmitting, using the processor, the block query via the output port;

receiving, using the processor, the at least two segments via an input port corresponding to the output port, adjusting, using the processor, a size of the block range based on whether the at least two segments are received within a predetermined reception lifetime such that
 the size of the block range is increased in response that the at least two segments are received within the predetermined reception lifetime, and
 the size of the block range is decreased in response that any of the at least two segments is not received within the predetermined reception lifetime, and generating, using the processor, a new block query based on the adjusted size of the block range.

6. The method of claim 5, further comprising:
setting, using the processor, a flag corresponding to the found content name;
applying, using the processor, the flag to a flag field assigned to the at least two segments in the routing table in order to indicate that the at least two segments are included in the block query;
for segments among the at least two segments having the same transmission direction, setting, using the processor, a block range of segment numbers corresponding to the generated block query in a number field; and
setting, using the processor, a state field of each of the block range of segments corresponding to the block query.

7. The method of claim 6, further comprising:
setting, using the processor, a state field of the requested content in the routing table; and
setting, using the processor, a reception direction of the block query with respect to the at least two segments corresponding to the block query.

8. The method of claim 5, wherein one or more of the received block range of segments corresponding to the block query have different routing paths.

9. A terminal device comprising:
a query receiver to receive, via a first input port, a block query containing a request for at least two segment from among segments of content, wherein the at least two segments are to be routed based on a content name of the content, the block query comprises the content name and the block range indicating the at least two segments;
a search processor configured to determine whether or not the requested segments are stored in a storage unit;
a content transmitter; a query transmitter; and a content receiver,
(A) wherein when the requested segments are stored in the storage unit,
 the content transmitter transmits the requested segments via a first output port corresponding to the first input port, and
(B) wherein any of the requested segments is not stored in the storage unit,
 the search processor searches, from a routing table, a content name which is longest-matched with the content name, and determines a transmission direction of the block query, the transmission direction comprising a second output port, provided in the routing table, corresponding to the searched content name,
 the query transmitter transmits the block query via the second output port, and the content receiver receives the at least two segments via a second input port corresponding to the second output port.

10. The terminal device of claim 9, further comprising:
a field setting processor configured to set a flag corresponding to the content name, and apply the flag to a flag field assigned to the at least two segments in the routing table in order to indicate that the at least two segments are included in the block query.

11. The terminal device of claim 10, wherein the field setting processor is further configured to set a state field of the requested content in the routing table, and to set a reception direction of the block query with respect to the at least two segments corresponding to the block query.

12. The terminal device of claim 8, further comprising:
a field setting processor configured to set the routing table to include fields for the requested at least two segments.

13. The terminal device of claim 12, wherein the fields for the requested at least two segments comprises a content name field, a transmission direction field, a reception direction field, a flag field, and a number field.

14. The terminal device of claim 13, wherein the fields for the requested at least two segments further comprises a state field, and a lifetime field.

15. The terminal device of claim 14, wherein each of the requested at least two segments corresponds to an individual routing element comprising the number field, the state field, and the lifetime field.

16. The terminal device of claim 14, wherein the content name field and the flag field are shared by the requested at least two segments.

17. A method for routing based on content name, comprising:
receiving, using a processor via first input port, a block query containing request for at least two segments from among segments of content, wherein the at least two segments are to be routed based on a content name of the content, the block query comprises the content name and a block range indicating the at least two segments;
determining, using the processor, whether or not the requested segments are stored in a storage unit;
(A) wherein when the requested segments are stored in the storage unit,
 transmitting, using the processor, the requested segments via a first output port corresponding to the first input port;
(B) wherein when any of the requested segments is not stored in the storage unit,
 searching, using the processor, from a routing table, a content name which is longest-matched with the content name,
 determining, using the processor, a transmission direction of the block query, the transmission direction comprising a second output port, provided in the routing table, corresponding to the searched content name,
 transmitting, using the processor, the block query via the second output port, and
 receiving, using the processor, the at least two segments via a second input port corresponding to the second output port.

18. The method of claim 17, further comprising:
setting, using the processor, a flag corresponding to the found content name; and
applying, using the processor, the flag to a flag field assigned to the at least two segments in the routing table in order to indicate that the at least two segments are included in the block query.

19. A network apparatus using a routing table, comprising:
a processor; and
the routing table, wherein the routing table comprises:
- a content name field, configured to be used by the processor to search for content comprising a plurality of segments, and more specifically, to search for a content name that is longest-matched with the content name listed in a block query, wherein the block query comprises a content name and a block range of segments of the content, wherein the block range comprises a start segment and a last segment from among at least two segments of the block query,
- a transmission direction field, configured to be used by the processor to transmit a block query containing a request for at least two segments among the plurality of segments of the content, by using the transmission direction set in the transmission direction field,
- a reception direction field, configured to be used by the processor to indicate a reception direction of the block query, wherein the reception direction field comprises the reception direction of the block query, and the content listed in the block query is transmitted by using the reception direction of the block query,
- a flag field, configured to be assigned to the at least two segments in the routing table, and to be used by the processor to indicate that the at least two segments are included in the block query,
- a number field, configured to be used by the processor to indicate a number of a segment listen in the block query,
- a state field, configured to be used by the processor to indicate whether the content listed in the transmitted block query is received, and
- a time field, configured to be used by the processor to indicate a predetermined reception lifetime of the content.

\* \* \* \* \*